United States Patent
Le Faucheur et al.

(10) Patent No.: US 7,894,864 B2
(45) Date of Patent: Feb. 22, 2011

(54) ESTIMATION OF POWER LEVEL IN A COMMUNICATION DEVICE

(75) Inventors: Laurent Le Faucheur, Antibes (FR); Francois Goeusse, Grasse (FR); Paul Folacci, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 737 days.

(21) Appl. No.: 11/932,045

(22) Filed: Oct. 31, 2007

(65) Prior Publication Data

US 2009/0088226 A1  Apr. 2, 2009

(30) Foreign Application Priority Data

Sep. 28, 2007  (EP) .................... 07291181

(51) Int. Cl.
*H04M 1/00* (2006.01)
*H04B 17/00* (2006.01)
*G08C 17/02* (2006.01)

(52) U.S. Cl. ............. 455/574; 455/343.2; 455/115.1; 370/311

(58) Field of Classification Search .............. 455/574, 455/343.5, 115.1
See application file for complete search history.

(56) References Cited

U.S. PATENT DOCUMENTS

| 6,201,954 | B1 * | 3/2001 | Soliman .................. 455/226.2 |
| 6,898,437 | B1 * | 5/2005 | Larsen et al. ............... 455/522 |
| 2002/0044538 | A1 * | 4/2002 | Lee ............................ 370/332 |
| 2004/0203397 | A1 * | 10/2004 | Yoon et al. ................. 455/63.1 |
| 2005/0096053 | A1 * | 5/2005 | Liu et al. .................... 455/439 |
| 2006/0046661 | A1 * | 3/2006 | Ekvetchavit et al. ..... 455/115.1 |
| 2008/0181290 | A1 * | 7/2008 | Li et al. ...................... 375/227 |

* cited by examiner

*Primary Examiner*—Nick Corsaro
*Assistant Examiner*—Tangela T. Chambers
(74) *Attorney, Agent, or Firm*—John R. Pessetto; W. James Brady; Frederick J. Telecky, Jr.

(57) ABSTRACT

A system comprising a first communication device and a second communication device adapted to determine a property of communications between the first and second communication devices. The second communication device estimates a power level associated with the first communication device for a length of time determined according to the property.

4 Claims, 1 Drawing Sheet

US 7,894,864 B2

ESTIMATION OF POWER LEVEL IN A COMMUNICATION DEVICE

CROSS-REFERENCE TO RELATED APPLICATION

The present application claims priority to EP Application No. 07291181.1, filed on Sep. 28, 2007, hereby incorporated herein by reference.

BACKGROUND

Mobile communication devices (e.g., cell phones, wireless hand-held computers, etc.) are battery-operated. A device operating from a battery only has a finite operational time before the battery needs recharging. Charging a mobile communication device battery can be an inconvenient and time-consuming task. For these and other reasons, techniques which enhance battery life are desirable.

SUMMARY

Accordingly, these are disclosed herein techniques for adaptively adjusting lengths of time during which base station radio frequency (RF) power is estimated so that battery power is conserved. An illustrative embodiment includes a system comprising a first communication device and a second communication device adapted to determine a property of communications between the first and second communication devices. The second communication device estimates a power level associated with the first communication device for a length of time determined according to the property.

Another illustrative embodiment includes a system comprising transceiver logic and processing logic coupled to the transceiver logic. The processing logic determines a signal-to-noise ratio (SNR) of communications received via the transceiver logic from an electronic device external to the system. Based on the SNR, the processing logic adaptively adjusts a length of time during which the system determines radio frequency (RF) power associated with the electronic device.

Yet another illustrative embodiment includes a method that comprises determining a first signal-to-noise ratio (SNR) between a mobile device and a first target device. The method also comprises determining a second SNR between the mobile device and a second target device. The method further comprises determining a first radio-frequency (RF) power level of the first target device for a first period of time. The method further comprises determining a second RF power level of the second target device for a second period of time. The first SNR is greater than the second SNR. The second period of time is longer than the first period of time.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
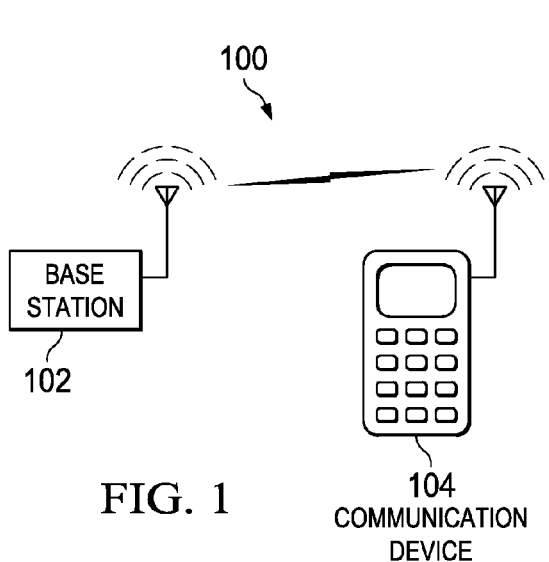
FIG. 1 shows an illustrative communication system implemented in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical or wireless connection. Thus, if a first device couples to a second device, that connection may be through a direct electrical or wireless connection, or through an indirect electrical or wireless connection via other devices and connections. The term "connection" refers to any path via which a signal may pass. For example, the term "connection" includes, without limitation, wires, traces and other types of electrical conductors, optical devices, wireless pathways, etc. Further, the term "or" is meant to be interpreted in an inclusive sense rather than in an exclusive sense.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Mobile communication devices operate in one or more networks. Some networks comprise multiple cells. Each cell comprises a geographical area. Within that cell's geographical area are one or more base stations and one or more communication devices. A communication device within the cell communicates with other devices (located inside or outside the cell) via one or more of that cell's base stations. In some cases, a communication device also may communicate with base stations outside the cell in which the device is located. For example, a communication device may monitor the signal-to-noise ratio (SNR) of signals sent from the base station of a neighboring cell.

When a device communicates with a base station, the device may estimate (i.e., determine or attempt to determine) the radio frequency (RF) power of the base station's transmissions. The device estimates the RF power, for example, to prepare for handovers between cells, although the device also may estimate RF power for various reasons. The time periods during which the device estimates the RF power of base station transmissions are referred to as the "RF power analysis windows." Disclosed herein are various embodiments of a technique by which a communication device adaptively adjusts RF power analysis window lengths. The RF power analysis window lengths preferably are adjusted in accordance with the signal-to-noise ratios (SNR) of signals transmitted from the base station to the communication device. In preferred embodiments, the communication device decreases RF power analysis window lengths in response to increased SNRs and increases RF power analysis window lengths in response to decreased SNRs. Adaptively adjusting RF power analysis window lengths in this manner conserves battery power, as explained below.

FIG. 1 shows a system 100 (e.g., a network) comprising a base station 102 and a communication device 104. The system 100 may comprise a mobile phone network cell, multiple cells, or any other suitable system for communication. In embodiments where the system 100 comprises multiple cells, the base station 102 and the device 104 may be in the same cell or in separate cells. The communication device 104 may comprise any suitable type of communication device, such as a mobile communication device (e.g., cellular telephone; personal digital assistant (PDA); any multimedia communication device; a radio system installed in a vehicle; a pager; any suitable hand-held computer; and any wired or wireless device).

Figure 2:
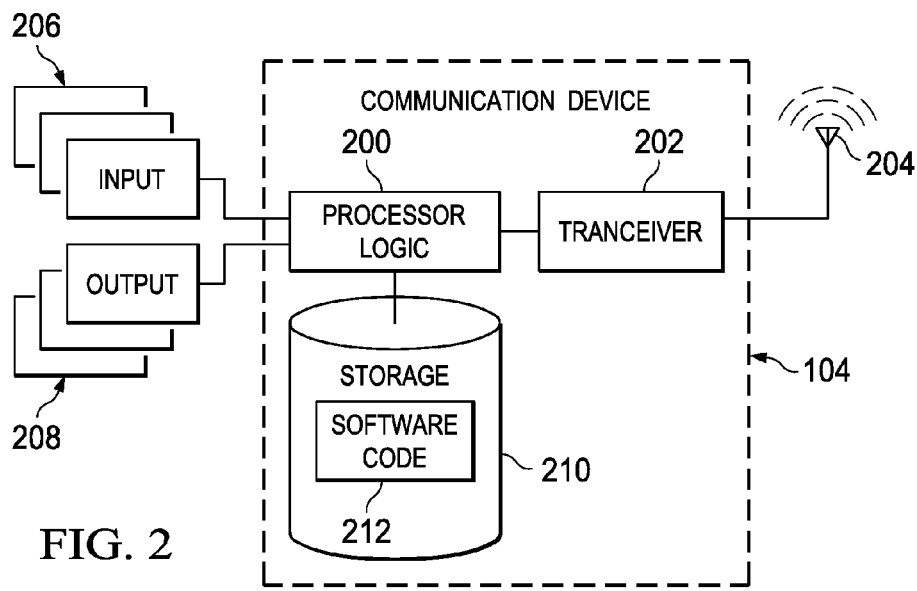
FIG. 2 shows a block diagram of an illustrative communication device used in the system of FIG. 1, in accordance with various embodiments.

FIG. 2 shows a block diagram of circuit logic housed within, or coupled to, the communication device 104. The device 104 comprises a processing logic 200, a transceiver (or, alternatively, a receiver) 202 coupled to an antenna 204, one or more input devices 206 (e.g., microphone, keypad, various buttons), one or more output devices 208 (e.g., display, speaker) and a storage 210 comprising software code 212. The storage 210 may comprise a processor (computer)-readable medium such as random access memory (RAM), volatile storage such as read-only memory (ROM), a hard drive, flash memory, etc. or combinations thereof. Although storage 210 is represented in FIG. 2 as being a single storage unit, in some embodiments, the storage 210 comprises a plurality of discrete storage units. The software code 212, when executed by the processing logic 200, causes the processing logic 200 to perform at least some of the techniques disclosed herein. The software code 212 may comprise one particular portion of code that performs a specific set of actions, multiple portions of code that perform various actions, etc.

Referring to FIGS. 1 and 2, the device 104 monitors the radio frequency (RF) power of transmissions emitted by the base station 102. By "monitor," it is meant that the device 104 estimates (e.g., determines) the RF power of transmissions emitted by the base station 102 on a regular or irregular basis. The device 104 may monitor this RF power regardless of whether the base station 102 is in the same cell as the device 104 or in a different cell than the device 104. If the device 104 is in a different cell than the base station 102, the device 104 is able to monitor the RF power because the device 104 is still within communication range of the base station 102. As mentioned above, a period of time during which the device 104 estimates the RF power of base station 102 transmissions is referred to as an "RF power analysis window." In some embodiments, when an RF power analysis window is open, the device 104 estimates the RF power of base station transmissions using digital samples. The samples result from analog-to-digital (A/D) conversion of the RF modulation captured from the antenna. The RF signal is first amplified through a low noise amplifier (LNA) and then converted to digital form. If the power estimation results in X dB, the real power level is X dB minus the LNA gain. In some embodiments, the device 104 may estimate the RF power of multiple base stations at the same time, and so the device 104 may be using multiple windows simultaneously or substantially simultaneously. The term "estimating," as used herein, may generally be understood to mean "determining," "determining to the best of one's ability," "determining to a reasonable degree of precision and/or accuracy," or other reasonable definitions of the term "estimate" and/or "estimating" as commonly understood by those of ordinary skill in the art.

Not all RF power analysis windows need to be of the same length. In some cases, such as when the distance between the base station 102 and the communication device 104 is relatively small, the amount of time needed to estimate the RF power may be less than when the distance between the station 102 and the device 104 is relatively large. More specifically, when the distance between the station 102 and the device 104 is small, the signal-to-noise ratio (SNR) therebetween may be high. Accordingly, only a few transmission samples from the base station 102 are needed to estimate the base station's RF power. However, when the distance between the station 102 and the device 104 is large, the SNR therebetween may be low. Accordingly, a greater number of transmission samples from the base station 102 may be needed to estimate the base station's RF power. Thus, when estimating the RF power of base station transmissions, the device 104 adaptively adjusts the lengths of RF power analysis windows in accordance with the SNRs associated with those transmissions. Preferably, the device 104 may lengthen the RF power analysis windows when the SNR is low, because more samples are needed to estimate RF power. Similarly, the device 104 may shorten the RF power analysis windows when the SNR is high, because fewer samples are needed to estimate RF power.

Figure 3:
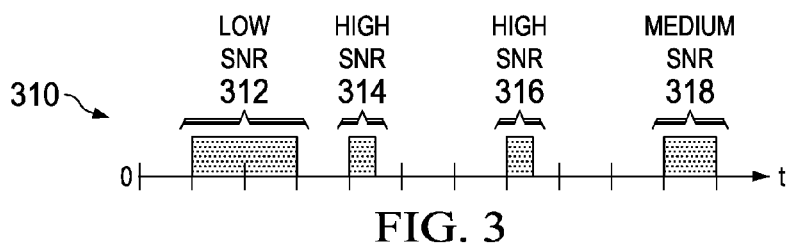
FIG. 3 shows a diagram illustrative of systems that implement the techniques disclosed herein, in accordance with preferred embodiments.

FIG. 3 demonstrates RF power analysis as implemented in the communication device 104. FIG. 3 shows an RF power analysis window diagram 310 comprising multiple RF power analysis windows 312, 314, 316 and 318. The window 312 is used to estimate the RF power associated with base station transmissions that happen to have low SNR. The windows 314 and 316 are used to estimate the RF power associated with base station transmissions that happen to have high SNR. The window 318 is used to estimate the RF power associated with base station transmissions that happen to have medium SNR. Because the device 104 adaptively adjusts RF power analysis window lengths based on SNR levels, the windows associated with low SNR levels (e.g., window 312) are relatively long. Similarly, windows associated with high SNR levels (e.g., windows 314 and 316) are relatively short. Likewise, windows associated with medium SNR levels (e.g., window 318) are of a length between the lengths of low-SNR windows and high-SNR windows. In this way, the length of each RF power analysis window preferably is "customized" to be just enough to estimate the RF power of base station transmissions for a particular SNR level. Accordingly, battery power is conserved.

Referring again to FIG. 2, the device 104 adaptively adjusts RF power analysis window lengths as follows. The processing logic 200 executes the software code 212. As a result, the software code 212 causes the processing logic 200 to estimate the RF power associated with a base station, such as the base station 102. More specifically, the processing logic 200 first determines an SNR associated with the base station 102. The processing logic 200 may determine the SNR using any suitable technique. For example, the logic 200 may determine the SNR using data from channels (e.g., SCH, BCCH, PCH, CCCH). Alternatively, the logic 200 may determine the SNR as disclosed in co-pending, commonly-assigned U.S. patent application Ser. No. 11/771,672, incorporated herein by reference. Any and all suitable techniques for determining SNR may be used.

After the processing logic 200 has determined the SNR of communications between the device 104 and the base station 102, the logic 200 estimates the RF power level associated with the base station 102 by collecting multiple samples of data from the base station 102. As previously explained, the time period during which these samples are collected is the RF power analysis window, and the logic 200 adaptively adjusts the length of the RF power analysis window based on the SNR level. If the processing logic 200 determines a relatively low SNR (e.g., an SNR level that meets or exceeds a predetermined threshold; an SNR level that does not meet or exceed a predetermined threshold), the logic 200 may gather samples for a relatively long period of time (i.e., a long RF power analysis window). Conversely, if the processing logic 200 determines a relatively high SNR (e.g., an SNR level that meets or exceeds another predetermined threshold; an SNR level that does not meet or exceed that predetermined threshold), the logic 200 may gather samples for a relatively short period of time (i.e., a short RF power analysis window). Any number of such thresholds, algorithms, etc. may be implemented to match a particular SNR level with a particular RF power analysis window length. The thresholds, algorithms, etc. may be pre-programmed and may be adjustable as desired. When the RF power analysis window is open, the processing logic 200 estimates the RF power as explained above.

In some embodiments, windows may have a predetermined length. In some such embodiments, the device 104 may adjust the window length prior to the opening of the window (e.g., based on an SNR level determined prior to opening the window). In some embodiments, the window length may be determined on-the-fly. Stated otherwise, the window may be opened with a default window length which may be adjusted on-the-fly before the window is closed. Window length may be computed at any suitable frequency (e.g., every window, every other window, per unit time, etc.). Further, window length may be adjusted in any suitable manner. For example, window length may be adjusted based on a target length value calculated using a predetermined formula. In some embodiments, the window length is associated with the square root of the inverse of the SNR:

$$\text{Window\_Length} = L0 - k * \text{SQRT}(1/\text{SNR})$$

where L0 is the minimum window length for very good SNR conditions, k is a multiplication factor (e.g., observed to be in the range of 20; between 15 and 25), and SNR is the signal to noise ratio.

Figure 4:
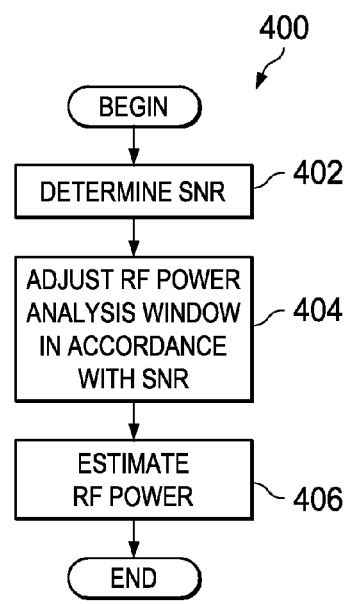
FIG. 4 shows a flow diagram of a method implemented in accordance with various embodiments.

FIG. 4 shows a method 400 implemented in accordance with various embodiments. The method 400 begins by determining an SNR level associated with transmissions from a base station (block 402). The method 400 continues by adjusting the RF power analysis window length in accordance with this SNR level (block 404). The method 400 then comprises estimating the RF power associated with the base station (block 406). In some embodiments, RF power and SNR may be determined at or approximately at the same time. The process is then complete.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A communication system for reducing power in a mobile communication device, comprising:
   a base station; and
   the mobile communication device adapted to determine a signal-to-noise ratio between the base station and the mobile communication device;
   wherein the mobile communication device is configured to estimate a radio frequency power level associated with the base station for a length of time determined according to the signal-to-noise ratio;
   wherein the mobile communication device is configured to determine the length of time using a formula: Length of Time=L0−k(SQRT(1/SNR)), wherein L0 is a minimum window length, k is a multiplication factor, SNR is a signal to noise ratio, and SQRT is a square root function.

2. The system of claim 1, wherein the SNR ranges between 15 and 25.

3. A mobile communication device, comprising:
   transceiver logic; and
   a processor coupled to the transceiver logic;
   wherein the processor is configured to determine a signal-to-noise ratio (SNR) of communications received via the transceiver logic from an electronic device external to the mobile communication device;
   wherein, based on said SNR, the processor is configured to adaptively adjust a length of time during which the mobile communication device determines radio frequency (RF) power associated with the electronic device;
   wherein the length of time is determined using a formula: Length of Time=L0−k(SQRT(1/SNR)), wherein L0 is a minimum window length, k is a multiplication factor, SNR is a signal to noise ratio, and SQRT is a square root function;
   wherein power is reduced in the mobile communication device.

4. The system of claim 3, wherein the SNR ranges from 15 to 25.

* * * * *